(12) United States Patent
V. Nechitailo

(10) Patent No.: US 6,760,523 B2
(45) Date of Patent: Jul. 6, 2004

(54) TAPE BASED HIGH FIBER COUNT CABLE

(75) Inventor: Nicholas V. Nechitailo, Conover, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/883,998

(22) Filed: Jun. 20, 2001

(65) Prior Publication Data

US 2002/0197031 A1 Dec. 26, 2002

(51) Int. Cl.$^7$ .............................................. G02B 6/44
(52) U.S. Cl. ..................................................... 385/112
(58) Field of Search ........................ 385/109–114, 105, 385/106

(56) References Cited

U.S. PATENT DOCUMENTS

| | | | |
|---|---|---|---|
| 4,146,302 A | 3/1979 | Jachimowicz | 350/96.23 |
| 4,468,089 A | 8/1984 | Brorein | 350/96.23 |
| 4,952,020 A | 8/1990 | Huber | 350/96.23 |
| 5,166,998 A | 11/1992 | Patel | 385/114 |
| 5,212,756 A | 5/1993 | Eoll | 385/114 |
| 5,343,549 A * | 8/1994 | Nave et al. | 385/103 |
| 5,440,665 A | 8/1995 | Ray et al. | 385/135 |
| 5,608,832 A | 3/1997 | Pfandl et al. | 385/112 |
| 5,720,908 A | 2/1998 | Gaillard | 264/1.28 |
| 5,917,977 A | 6/1999 | Barrett | 385/101 |
| 5,933,559 A | 8/1999 | Petisce | 385/114 |
| 6,085,010 A | 7/2000 | Zahora et al. | 385/114 |
| 6,215,932 B1 * | 4/2001 | Hardwick, III et al. | 385/114 |
| 6,304,699 B2 * | 10/2001 | Field et al. | 385/100 |
| 6,304,701 B1 * | 10/2001 | Bringuier et al. | 385/106 |
| 6,321,013 B1 * | 11/2001 | Hardwick, III et al. | 385/114 |

OTHER PUBLICATIONS

Reinforced Plastics, Extended–Chain Polyethylene Fibers (Author unknown) Chapter 76, 1 page, no date.
Reinforced Plastics, Aramid Fibers, Paul Langston and George E. Zahr, Chapter 77, 9 page, no date.
Reinforced Plastics, Composites Lay–Up and Bagging, E.A. Greene, Chapter 78, 1 page, no date.
Reinforced Plastics, Filament Winding, A.M. Shibley, Chapter 79, 6 page, no date.

* cited by examiner

Primary Examiner—Javaid H. Nasri
(74) Attorney, Agent, or Firm—Sughrue Mion, PLLC

(57) ABSTRACT

The present invention includes an optical fiber cable configuration comprising fibers that are grouped into buffer tubes or buffer cells, containing fiber bundles or ribbon stacks, using a lightweight fabric-type composite tape material to serve as a light-weight strength member and protective low-thermal-expansion sheath. A plurality of the buffer tubes or buffer cells of various shapes are then positioned upon another piece of composite tape material. Gel or foamy glue is placed on the tape and is used to secure the buffer tubes to the tape. A triangular or trapezoidal stack is then formed by rolling the tape to enclose the buffer tubes and excess gel serves to fill in gaps. Multiple stacks may then be stranded to form a larger super-cable structure that uses a piece of composite tape material along with the rolling process, as described above, to support the individual stacks.

20 Claims, 4 Drawing Sheets

TAPE BASED HIGH FIBER COUNT CABLE

BACKGROUND OF THE INVENTION

1. Field of the Invention

The present invention generally relates to the field of fiber optic cables, in particular the present invention is directed to a new and novel method and apparatus for supporting and packaging optical fibers.

2. Discussion of Related Art

Optical fibers are very small diameter glass strands which are capable of transmitting an optical signal over great distances, at very high speeds, and with relatively low signal loss as compared to standard wire or cable networks. Optical fibers are used in many areas of technology, and because of this development, there is a growing need to have fiber optic cable configurations which can provide adequate support for the optical fibers, and which are sized so that they can be effectively used in various environments.

An example of a common fiber optic cable cross-section can be seen in FIG. 1. At the center of the cable is a central strength member 1. The central strength member 1 can be made from a number of different materials, such as hard plastic, glass, or a glass reinforced composite and is used as a load bearing member for the cable, as well as for supporting the inner sides of buffer tubes 2 that are typically stranded around the central strength member in a helical path. Although FIG. 1 shows six buffer tubes 2, the quantity can increase or decrease depending on the particular application the cable is to be used for. Within each buffer tube 2 is a plurality of individual optical fibers 3. The optical fibers 3 can be configured in any number of ways. For example, within each buffer tube 2 there can be a stacked ribbon configuration (as shown in FIG. 1) where each ribbon has a plurality of individual fibers and there are a number of ribbons. Alternatively, the fibers 3 can be configured as bundles inside the buffer tube. The configuration will greatly depend on the use and application of the cable. Finally, the outer jacket 4 provides protection to the internal components of the cable, while aiding to keep all of the components together. The outer jacket 4 provides protection from the adverse physical elements that a cable can be exposed to during its use and installation.

Conventional optical fiber configurations, as shown in FIG. 1, use extruded thermoplastic materials for the outer jackets 4 and buffer tubes 2 to protect the fibers 3 and to create housings. Unfortunately, these materials contract too much at low temperatures causing deformation of the fibers. To minimize contraction, the diameter of the central strength member 1 can be increased or radial steel wires can be inserted in the jacket. Strength yarns 5 are also used to increase tensile strength. These additional elements increase the size of the cable and add to the overall cost. Thus, a high fiber count cable is needed that provides sufficient support for the optical fibers while not substantially increasing the cross-sectional size and weight of the cable.

SUMMARY OF THE INVENTION

The present invention is directed to eliminating the above problems associated with the use of various thermoplastics and multiple components, to form optical fiber configurations. Thus, the invention improves the quality of the optical fiber cable while reducing the cross-section size, number of components and weight.

The present invention addresses the above problems by providing an optical fiber configuration and method. The optical fiber configuration comprises fibers that are grouped by buffer tubes using a lightweight fabric-type composite tape material to serve as a strength member. The configuration is manufactured by first providing a plurality of optical fibers upon the composite tape material. Gel or foamy glue is placed on the tape and is used as a filler and an adhesive to secure the optical fibers to the tape. A buffer tube is then formed by rolling the composite tape or helically wrapping the tape around the fibers such that the tape takes on a tube shape and surrounds the fibers. Furthermore, multiple buffer tubes may be bundled together to form a stack. This is done by providing an additional piece of composite material having gel on one side, and placing the buffer tubes on the gel side of the composite tape material. The stack is then formed by rolling the tape to enclose the buffer tubes while excess gel serves to fill in gaps. Multiple stacks may then be stranded to form a larger cable that uses another piece of composite tape material along with an additional rolling process, similar to that described above. The individual stacks may be formed to have a triangular or trapezoidal shape for efficient packaging.

Thus, the present invention provides an optical cable configuration with improved quality while reducing the cross-section size, number of components and weight. The configuration employs innovative geometry and cost-effective materials for both dielectric and armored optical fiber cables. The tape provides a way of supporting and manipulating the optical fibers without extensive reliance on extruded plastic tubes or additional strength members, resulting in a reduced diameter. The fibers can be grouped into traditional buffer tubes or cell structures for easy identification. Additionally, with the increased number of fibers, a self-supporting effect is created that permits the fibers to carry an increased amount of external load, which further reduces excessive reliance on expensive and space-consuming strength members.

BRIEF DESCRIPTION OF THE DRAWINGS

The advantages, nature and various additional features of the invention will appear more fully upon consideration of illustrative embodiments of the invention which are schematically set forth in the drawings, in which.

DETAILED DESCRIPTION OF THE PREFERRED EMBODIMENTS

The present invention will be explained in further detail by making reference to the accompanying drawings, which do not limit the scope of the invention in any way.

Figure 1:
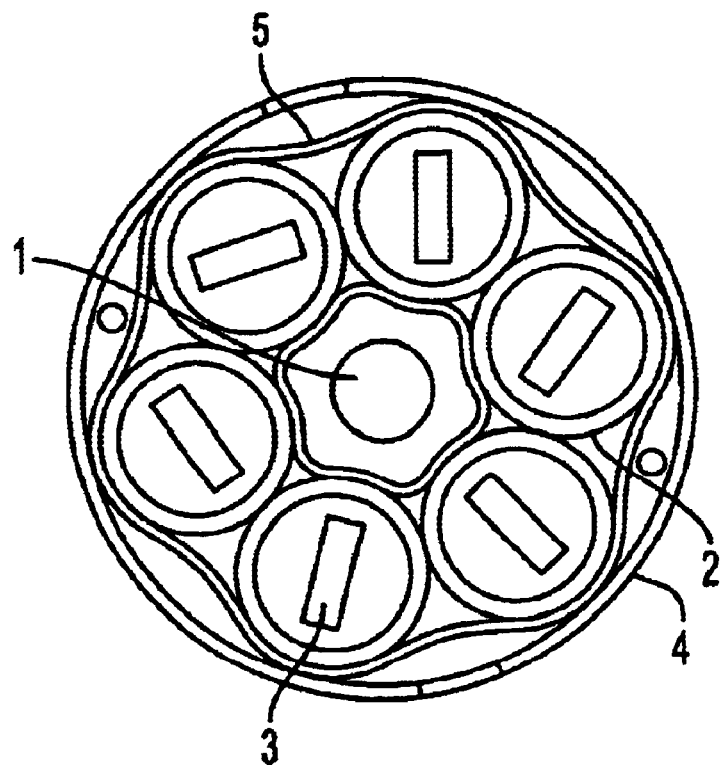
FIG. 1 is a cross-sectional view of a typical fiber optic cable.
Figure 2:
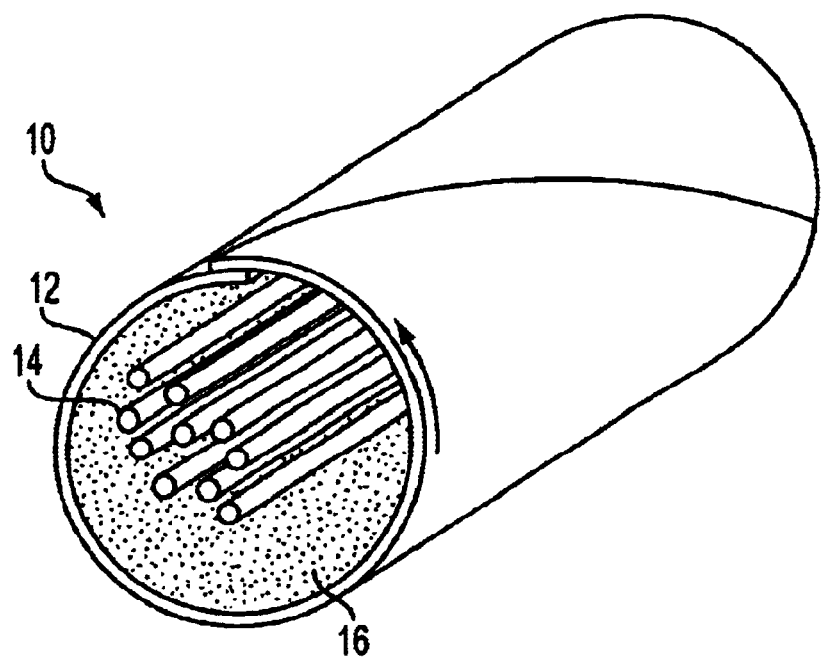
FIG. 2 is a perspective view of a buffer tube with optical fibers, made in accordance with the present invention.

An embodiment of the present invention is illustrated with reference to FIG. 2. A wound piece of composite tape 12 is provided to form a tubular shaped element or buffer tube 10. The composite tape 12 serves as a strength member to contain optical fibers 14. The optical fibers 14 are positioned in the buffer tube 10 according to the method described below. A gel or foamy glue 16 may be provided within the buffer tube 10 for filling the air gaps and positioning the optical fibers 14. The buffer tube 10 formed from the composite tape 12 according to the present invention acts to support and protect the fibers from external forces. The composite tape can be of the type known in the art, and which has adequate tensile and compression strength properties. The composite, by way of example, can be made by combining fibers of an organic mesh-type substrate with inorganic dot-type ceramic materials for fire protection (such as Nextel 3M Flame Stopping Dot Paper). The color of the composite tape may vary to allow for easy identification of the fibers in color-coded buffer cells.

Figure 3:
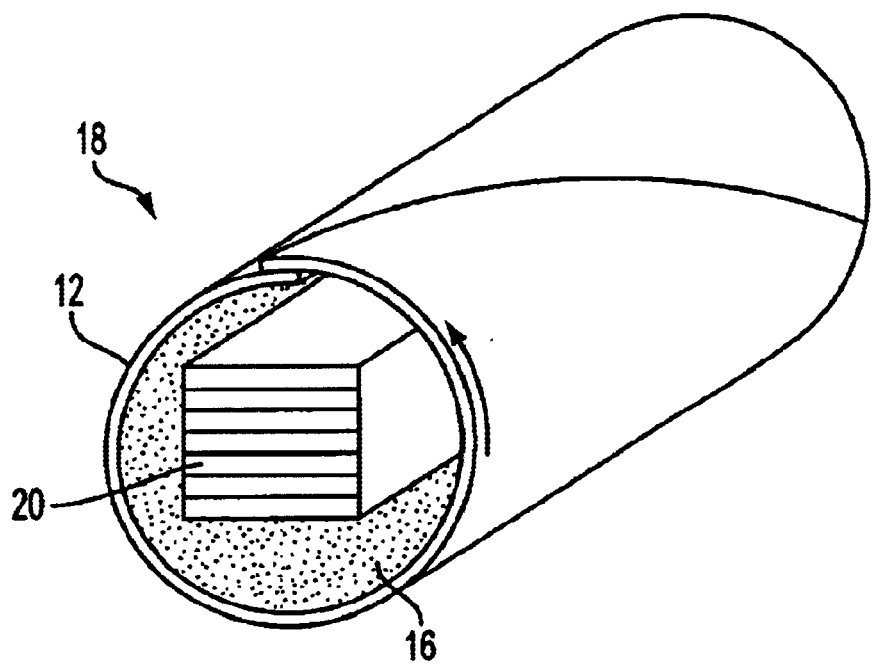
FIGS. 3 and 3a are, respectively, a perspective view of a buffer tube with optical fiber ribbons positioned inside the buffer tube, and a front view showing optical fiber ribbons positioned on an outside of a buffer tube, made in accordance with the present invention.
Figure 3A:
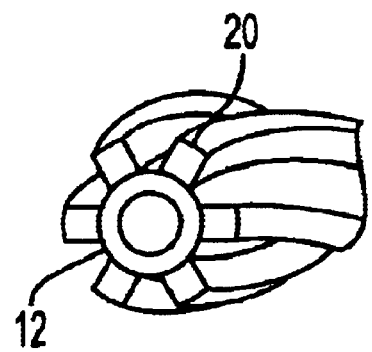

As shown in FIG. 3, a buffer tube 18 may also be formed to contain optical fiber ribbons 20. The optical fiber ribbons 20 allow for an increase in fiber packing density within the given space created by the rolled composite tape 12. This is advantageous as higher packing densities allow for more fiber to be placed in a given diameter cable and thus more efficient use of existing cable ducts. Further, use of the optical fiber ribbons 20 provide easier fiber identification, maintenance and splicing when working on the fibers. The size of the optical fiber ribbons 20 may be varied depending on the particular application. Also, similar to the embodiment of FIG. 2, a gel or foamy glue 16 may be provided within the buffer tube 18 for filling the air gaps and positioning the optical fibers ribbons 20. As shown in FIG. 3a, it may also be advantageous to provide the optical fibers 14 or the optical fiber ribbons 20 on an outside portion of the rolled composite tape 12, such that the composite tape 12 is rolled to form a tube and optical fiber ribbons 20 are positioned radially or helically stranded on the outside portion of the rolled composite tape 12. This configuration provides particular benefits because stacks of ribbons are positioned on top of a light-weight cylinder made of a composite material. The cylinder is empty, thus the cable weight is reduced. Also, traditional thermoplastic or a new composite-tape layer can be used as an outer jacket to enclose the stacks of ribbons. In addition, the cavity of the hollow central tube can be used to run electric wires, or other elements typically found in hybrid telecommunication and power cables. Another benefit of this embodiment is that, when under radial compression, the hollow central tube does not embed into the ribbons, but rather deforms, and protects the fibers from excessive stress.

Figure 4:
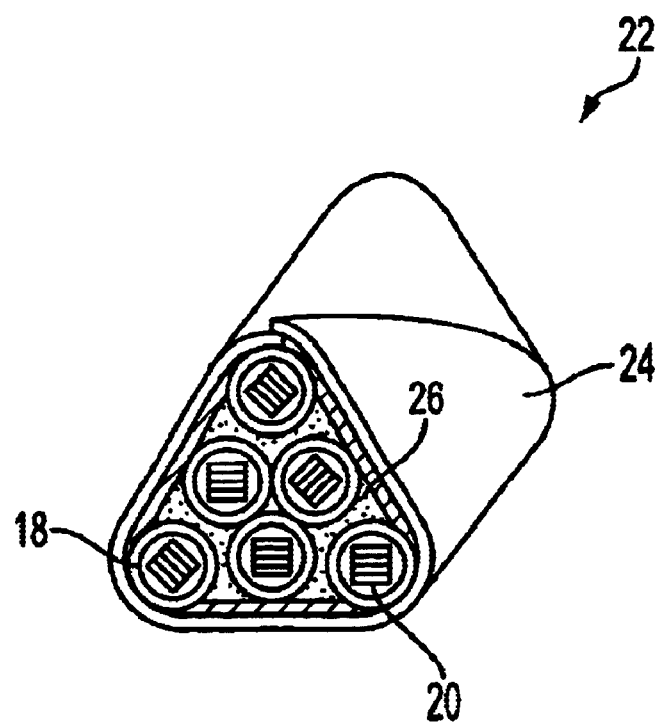
FIG. 4 is a perspective view of a fiber optic cable stack made with a plurality of buffer tubes.

FIG. 4 shows a stack 22 of buffer tubes 18 containing optical fiber ribbons 20. The stack 22 is bundled together by a piece of wound composite tape 24 that forms an outer jacket. The composite tape 24 serves as a strength and support member for the stack 22. Due to the physical attributes of the composite tape 24, it is possible to form the stack 22 to take on varies geometrical shapes. For example, as shown in FIG. 4, the stack 22 may be formed to have a triangular shape.

A gel or foamy glue 26 may be used to fill in gaps between the buffer tubes 18 and to bold the stack 22 together. Examples of suitable gel formulations include gels comprised of mineral oils and/or synthetic polyolefin oils combined with a polymeric thixotropy modifier or pyrogenic silica. Commercially available gel compounds include Mastergel R-1806 and R-1806LT. By bundling together multiple buffer tubes 18 to form a stack 22, a self-supporting effect is created that permits the optical fiber ribbons 20 to carry an increased amount of external load. Thus, when multiple fibers are disposed in a tube, they can carry loads themselves, with a minimized contribution from additional strength members, so as to form a self-supporting structure. Also, when the number of fibers per tube is increased, the required strength contribution from a fabric-composite wall is lessened, so the wall thickness can be reduced. This results in a reduction of reliance on expensive and space consuming strength members, which are traditionally used to provide stability and support to an optical fiber configuration. Although FIG. 4 shows buffer tubes 18 containing optical fiber ribbons 20, it will be appreciated that various configurations of optical fibers can be used within the buffer tubes.

Figure 5:
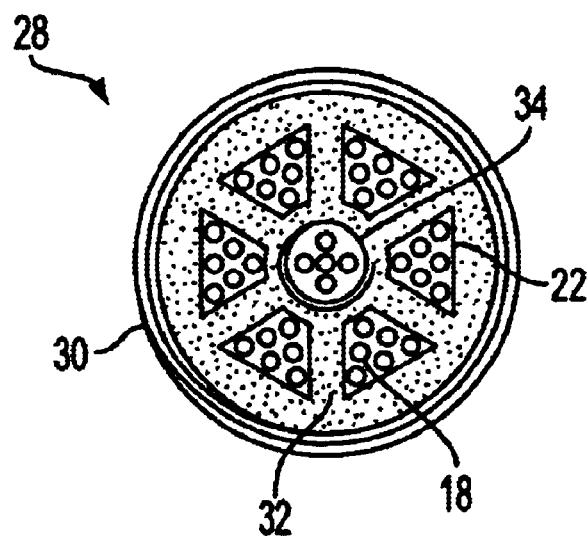
FIG. 5 is a front view of a fiber optic cable configuration made with a plurality of stacks, according to the present invention.

As shown in FIG. 5, an optical fiber cable configuration 28 is formed with a plurality of sub-units or stacks 22 containing a plurality of buffer tubes 18 with optical fibers. The optical fiber configuration 28 includes an additional piece of wound composite tape 30 that serves as a strength member to form an outer protective sheath, and which bundles together a plurality of stacks 22. As stated above, the stacks 22 may take on a variety of shapes. In one embodiment, the stacks 22 are formed to have a triangular or trapezoidal shape that allows for them to be disposed radially inside of the wound piece of composite tape 30 in a space-efficient manner similar to pie charts.

The space between adjacent stacks 22 of the optical fiber configuration 28 may be filled in with a gel 32, which acts to reduce water penetration along the cable length, to hold the stacks 22 in place and increases the overall stability of the optical fiber configuration. It will be appreciated that the number of stacks 22 that can be positioned within the outer protective sheath 30 is dependent on the forming of the stacks 22 to have a shape which minimizes areas between adjacent stacks 22.

The optical fiber configuration 28 may also have an axial member 34 that is centrally positioned with respect to the outer protective sheath 30. The axial member 34 is used to provide further support to the optical fiber configuration 28, and can be used to hold and support additional optical fibers or other elongated elements such as electric power wire or power cable. In an effort to reduce the amount of thermoplastic present in the optical fiber configuration 28, the axial member may be formed from rolled composite tape, as described above with respect to the buffer tubes 10 and 18, and contain optical fibers 14, which may take the form of optical fiber ribbons 20.

Figure 6:
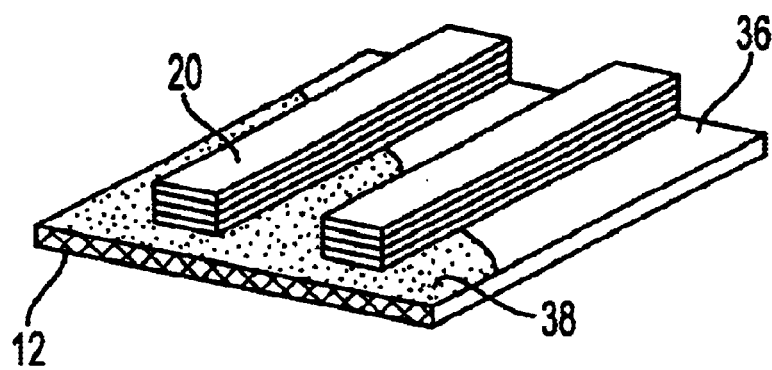
FIG. 6 is a perspective view of a piece of composite tape with optical fiber ribbons, which is used to show a method of making the present invention.

With reference to FIG. 6, a method of making an optical fiber configuration according to the present invention will be discussed. First, the composite tape 12 is positioned in an unrolled condition. A gel or foamy type glue 38 is applied to an open face 36 of the composite tape 12. Optical fibers are then positioned on the composite tape 12. It is noted that FIG. 6 shows the optical fibers in the optical fiber ribbon configuration 20, as discussed above with reference to FIG. 3; however, various configurations of optical fibers may be used. After the optical fiber ribbons 20 are placed on the composite tape 12 containing the gel, the composite tape 12 is rolled or wrapped around the fibers so that a buffer tube 18 configuration is formed. A similar rolling process is then performed to form the stacks 22, and then to form the optical fiber configuration that is described with reference to FIG. 5. The tape can be helically wrapped, or may be applied longitudinally.

Although the tape is described as being a composite tape, it will be appreciated that any tape having sufficient strength may be used.

Although the invention describes the use of buffer tubes, buffer cells, stacks and an outer protective sheath which are described as being formed from a wound piece of composite tape, it will be appreciated that one or more of these supportive members may be formed from the traditional thermoplastic materials.

Although the invention describes the formation of a unit of an optical fiber configuration, as shown in FIG. 5, it will be appreciated that the optical fiber unit shown in FIG. 5 can also be stranded around a common central strength member for example, helically, to form, for example a super-unit cable containing multiple units to form a cable having a larger number of optical fibers.

It is, of course, understood that departures can be made from the preferred embodiments of the invention by those of ordinary skill in the art without departing from the spirit and scope of the invention that is limited only by the following claims.

What is claimed:

1. An optical fiber cable configuration, comprising:
    an outer protective sheath formed from a piece of wound composite tape;
    a plurality of stacks which are stranded to be radially positioned within said outer protective sheath, wherein each of said plurality of stacks includes a plurality of buffer tubes,
    wherein said piece of wound composite tape includes a combination of fibers of a mesh-type substrate with at least one different type of material, and
    wherein each of said plurality of stacks is formed to have one of a triangular and trapezoidal shape.

2. The optical fiber cable configuration of claim 1, further comprising an axial member which is centrally positioned with respect to said outer protective sheath, and is formed from a wound piece of composite tape.

3. The optical fiber cable configuration of claim 1, wherein said buffer tubes each contain at least one optical fiber.

4. The optical fiber cable configuration of claim 1, wherein said buffer tubes each contain at least one optical fiber ribbon.

5. The optical fiber cable configuration of claim 1, wherein said plurality of stacks each have an outer portion formed from a wound piece of composite tape, which respectively supports said plurality of buffer tubes within each of said stacks.

6. The optical fiber cable configuration of claim 3, wherein each of said buffer tubes has an outer portion formed from a wound piece of composite tape, which supports said optical fiber contained in said buffer tube.

7. The optical fiber cable configuration of claim 4, wherein each of said buffer tubes has an outer portion formed from a wound piece of composite tape, which supports said optical fiber ribbon contained in said buffer tube.

8. The optical fiber cable configuration of claim 6, wherein said at least one optical fiber is surrounded with gel.

9. The optical fiber cable configuration of claim 7, wherein said optical fiber ribbon is surrounded with gel.

10. An optical fiber cable configuration, comprising:
    outer protective sheath;
    a plurality of stacks which are stranded to be radially positioned within said outer protective sheath, wherein each of said plurality of stacks includes a plurality of buffer tubes which contain an optical fiber and each of said plurality of stacks is formed to have one of a triangular shape and trapezoidal shape, wherein at least one of said outer protective sheath, said stacks, and said plurality of buffer tubes, has an outer support portion which is formed from a wound piece of composite tape.

11. An optical fiber cable configuration, comprising:
    a first buffer tube formed from a piece of wound composite tape;
    at least one optical fiber disposed in said first buffer tube;
    at least one second buffer tube formed from a piece of wound composite tape and positioned contiguous to said first buffer tube;
    at least one optical fiber disposed in said at least one second buffer tube; an outer jacket surrounding said first and second buffer tubes to form a first stack; and
    a protective sheath which contains said first stack and a second stack;
    wherein said first and second stacks are formed to have one of a triangular and trapezoidal shape, such that said stacks are in a radial arrangement with respect to a center of said protective sheath, and
    wherein said piece of wound composite tape of said first buffer tube and said second buffer tube includes a combination of fibers of a mesh-type substrate with at least one different type of material.

12. The optical fiber cable configuration of claim 11, wherein said outer jacket is formed from a piece of wound composite tape.

13. The optical fiber cable configuration of claim 11, wherein said protective sheath is formed from a wound piece of composite tape.

14. A method of making an optical fiber configuration, comprising:
    providing a piece of composite tape;
    applying gel to a first side of said composite tape;
    depositing an optical fiber on said composite tape;
    rolling said composite tape to form a buffer tube so that said optical fiber is contained within said buffer tube, wherein said composite tape provides support to said optical fiber;
    bundling a plurality of said buffer tubes with a composite tape to form a stack having one of a triangular shape and trapezoidal shape; and
    positioning, radially, a plurality of stacks within an outer protective sheath formed from a wound piece of composite tape.

15. The method of making an optical fiber configuration of claim 14, wherein said rolling is done helically.

16. An optical fiber cable configuration, comprising:
    an outermost protective sheath formed from a piece of tape, said tape made of a wound piece of composite material;
    a plurality of stacks which are stranded to be radially positioned within said outer protective sheath, wherein each of said plurality of stacks includes a plurality of buffer tubes.

17. An optical fiber cable configuration, comprising:
    outer protective sheath;
    a plurality of stacks which are stranded to be radially positioned within said outer protective sheath, wherein each of said plurality of stacks includes a plurality of buffer tubes which contain an optical fiber and each of said plurality of stacks is formed to have one of a triangular shape and trapezoidal shape, wherein at least one of said outer protective sheath, said stacks, and said plurality of buffer tubes, has an outermost support portion which is formed from a piece of tape, said tape made from a wound piece of composite material.

18. A method of making an optical fiber configuration, comprising:

providing a tape made from a composite material;

applying gel to a first side of said tape;

depositing an optical fiber directly on said tape;

rolling said tape to form a buffer tube with an outermost layer including said tape so that said optical fiber is contained within said buffer tube, wherein said tape provides support to said optical fiber.

19. An optical fiber cable configuration, comprising:

an outer protective sheath formed from a piece of wound composite tape;

a plurality of stacks which are stranded to be radially positioned within said outer protective sheath, wherein each of said plurality of stacks includes a plurality of buffer tubes; and an axial member which is centrally positioned with respect to said outer protective sheath, and is formed from a wound piece of composite tape.

20. An optical fiber cable configuration, comprising:

a first buffer tube formed from a piece of wound composite tape;

at least one optical fiber disposed in said first buffer tube;

at least one second buffer tube formed from a piece of wound composite tape and positioned contiguous to said first buffer tube;

at least one optical fiber disposed in said at least one second buffer tube;

an outer jacket surrounding said first and second buffer tubes to form a first stack, said outer jacket being formed from a piece of wound composite tape; and a protective sheath which contains said first stack and a second stack, wherein said first and second stacks are formed to have one of a triangular shape and trapezoidal shape, such that said stacks are in a radial arrangement with respect to a center of said protective sheath, and wherein said protective sheath is formed from a wound piece of composite tape.

* * * * *